(12) United States Patent
Smith et al.

(10) Patent No.: US 9,258,270 B2
(45) Date of Patent: Feb. 9, 2016

(54) SELECTING BETWEEN DOMAIN NAME SYSTEM SERVERS OF A PLURALITY OF NETWORKS

(71) Applicant: International Business Machines Corporation, Armonk, NY (US)

(72) Inventors: Paul D. Smith, Lexington, MA (US); Harley A. Stenzel, Hillsborough, NC (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 13/901,007

(22) Filed: May 23, 2013

(65) Prior Publication Data

US 2014/0351413 A1 Nov. 27, 2014

(51) Int. Cl.
*G06F 15/173* (2006.01)
*H04L 29/12* (2006.01)

(52) U.S. Cl.
CPC ........ *H04L 61/1511* (2013.01); *H04L 61/1552* (2013.01)

(58) Field of Classification Search
CPC ................... H04L 29/12009; H04L 29/12018; H04L 29/12028
See application file for complete search history.

(56) References Cited

U.S. PATENT DOCUMENTS

| | | | |
|---|---|---|---|
| 6,961,783 B1 * | 11/2005 | Cook et al. ................... 709/245 |
| 7,774,432 B2 | 8/2010 | Cartmell et al. |
| 7,996,207 B2 | 8/2011 | Atkin |
| 8,291,048 B2 | 10/2012 | Cartmell et al. |
| 8,769,057 B1 * | 7/2014 | Breau et al. .................. 709/220 |
| 2003/0110021 A1 | 6/2003 | Atkin |
| 2003/0163722 A1 * | 8/2003 | Anderson, IV ............... 713/200 |
| 2004/0095962 A1 * | 5/2004 | Ohta ............................. 370/475 |
| 2007/0118620 A1 | 5/2007 | Cartmell et al. |
| 2008/0043761 A1 * | 2/2008 | Kumar et al. ................. 370/401 |
| 2008/0235383 A1 | 9/2008 | Schneider |
| 2010/0299409 A1 | 11/2010 | Cartmell et al. |
| 2010/0299410 A1 | 11/2010 | Cartmell et al. |

OTHER PUBLICATIONS

Smith et al., "Selecting between Domain Name System Servers of a Plurality of Networks," U.S. Appl. No. 14/872,181, filed Oct. 1, 2015, 38 pages.

* cited by examiner

*Primary Examiner* — Esther B Henderson
(74) *Attorney, Agent, or Firm* — Yee & Associates, P.C.; Parahsos Kalaitzis

(57) ABSTRACT

A method and computer for managing domain name system services for a plurality of networks is disclosed. A computer identifies information for the plurality of networks to which a client device is connected. The computer receives a request to identify an internet protocol address for a domain name or vice-versa. In response to the request, the computer selects a particular set of domain name system servers of a particular network in the plurality of networks based on the information for the plurality of networks and a set of rules for selecting the particular set of domain name system servers when identifying the internet protocol address for the domain name. The computer then sends the request to identify the internet protocol address for the domain name to a domain name system server in the particular set of domain name system servers.

15 Claims, 7 Drawing Sheets

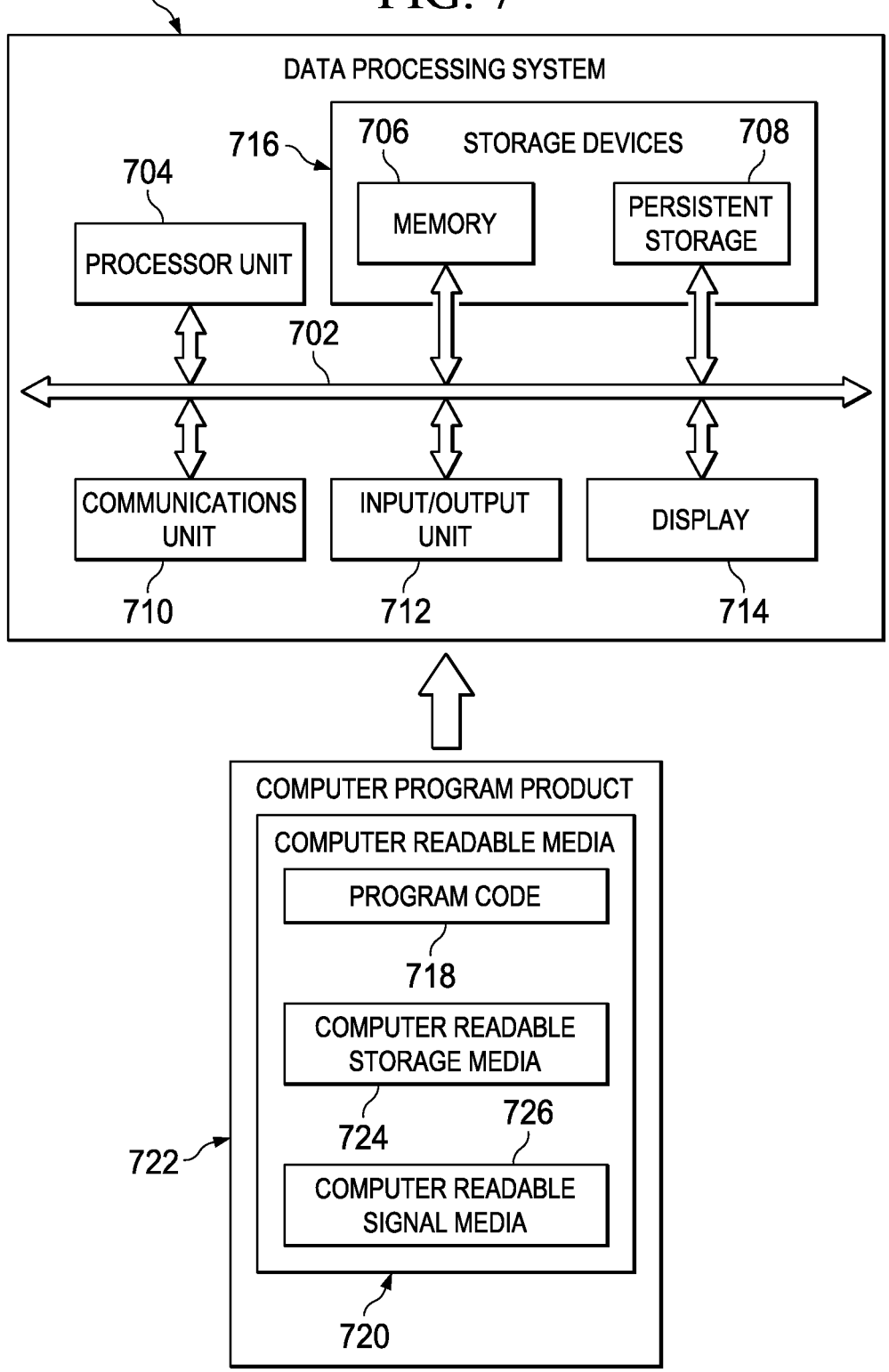

SELECTING BETWEEN DOMAIN NAME SYSTEM SERVERS OF A PLURALITY OF NETWORKS

BACKGROUND OF THE INVENTION

1. Field of the Invention

The disclosure relates generally to managing networks and, in particular, to selecting which domain name system servers of a plurality of networks that a client device uses for domain name system services.

2. Description of the Related Art

The Internet is a system of interconnected public and private computer networks. Computing devices communicate with each other over the Internet using a number of Internet protocols. These Internet protocols identify the computing devices and other resources on the Internet using Internet Protocol (IP) addresses. However, IP addresses are numeric, hard to remember, and can change over time.

To resolve the problems with IP addresses, a hierarchical distributed naming system called Domain Name System (DNS) is used. The primary function of DNS is to translate or map domain names representing computing devices and other resources to the actual IP addresses. Users of DNS register domain names with DNS and then configure associated IP addresses for each of the registered domain names. Domain names are selected by their owners to be easy to remember and typically do not change over time. DNS uses DNS servers to perform the functions of DNS.

DNS is designed such that each DNS server on the Internet is able to translate registered domain names to IP addresses. In practice, private computer networks often do not wish to register internal domain names and IP addresses with Internet based DNS. One work around to this problem is for private computer networks to host internal DNS servers configured to keep the domain names and IP addresses of the private computer network private. With this work around, client computing devices use one set of internal DNS servers for both internal and external domain names. Using internal DNS servers is a satisfactory workaround as long as the internal DNS servers have access to all of the desired domain names. However, this workaround fails when a situation arises where two or more private networks are involved and the private networks do not share registered domain names with each other. For example, when a client computing device is concurrently connected to a number of public and virtual private networks, it is unlikely that a single set of DNS servers hosted by any one particular network will have access to all of the domain names of all of the networks in use by the client computing device.

Another approach to solving this problem includes sending translation requests to multiple DNS servers. However, sending translation requests to multiple DNS servers may violate a desire for privacy when the private domain names in use by the client computing devices are sent to DNS servers outside of the private network where the private domain names are located. Additionally, performance of networks is degraded with this approach due to the resulting additional network traffic.

Still another approach involves using a DNS proxy to route translation requests to pre-defined DNS servers based on pre-defined domain names. Proxy solutions, however, require user configuration to map particular domain names to particular DNS servers. Proxy solutions fail when the configuration for the proxy solution is incomplete, incorrect, or out of date.

Therefore, it would be desirable to have a method, apparatus, and computer program product that takes into account at least some of the issues discussed above.

SUMMARY

In one illustrative embodiment, a method, data processing system, and computer program product for managing domain name system services for a plurality of networks is disclosed. A data processing system identifies information for the plurality of networks to which a client device is connected. The information for each network in the plurality of networks includes a set of private domains, a set of domain name system servers for use in searching for internet protocol addresses for domain names, and a set of routes. The data processing system receives a request to identify an internet protocol address for a domain name. In response to the request, the data processing system selects a particular set of domain name system servers of a particular network in the plurality of networks based on the information for the plurality of networks and a set of rules for selecting the particular set of domain name system servers when identifying the internet protocol address for the domain name. The data processing system then sends the request to identify the internet protocol address for the domain name to a domain name system server in the particular set of domain name system servers.

BRIEF DESCRIPTION OF THE DRAWINGS

FIG. 7 is an illustration of a data processing system in accordance with an illustrative embodiment.

DETAILED DESCRIPTION OF THE PREFERRED EMBODIMENT

Figure 1:
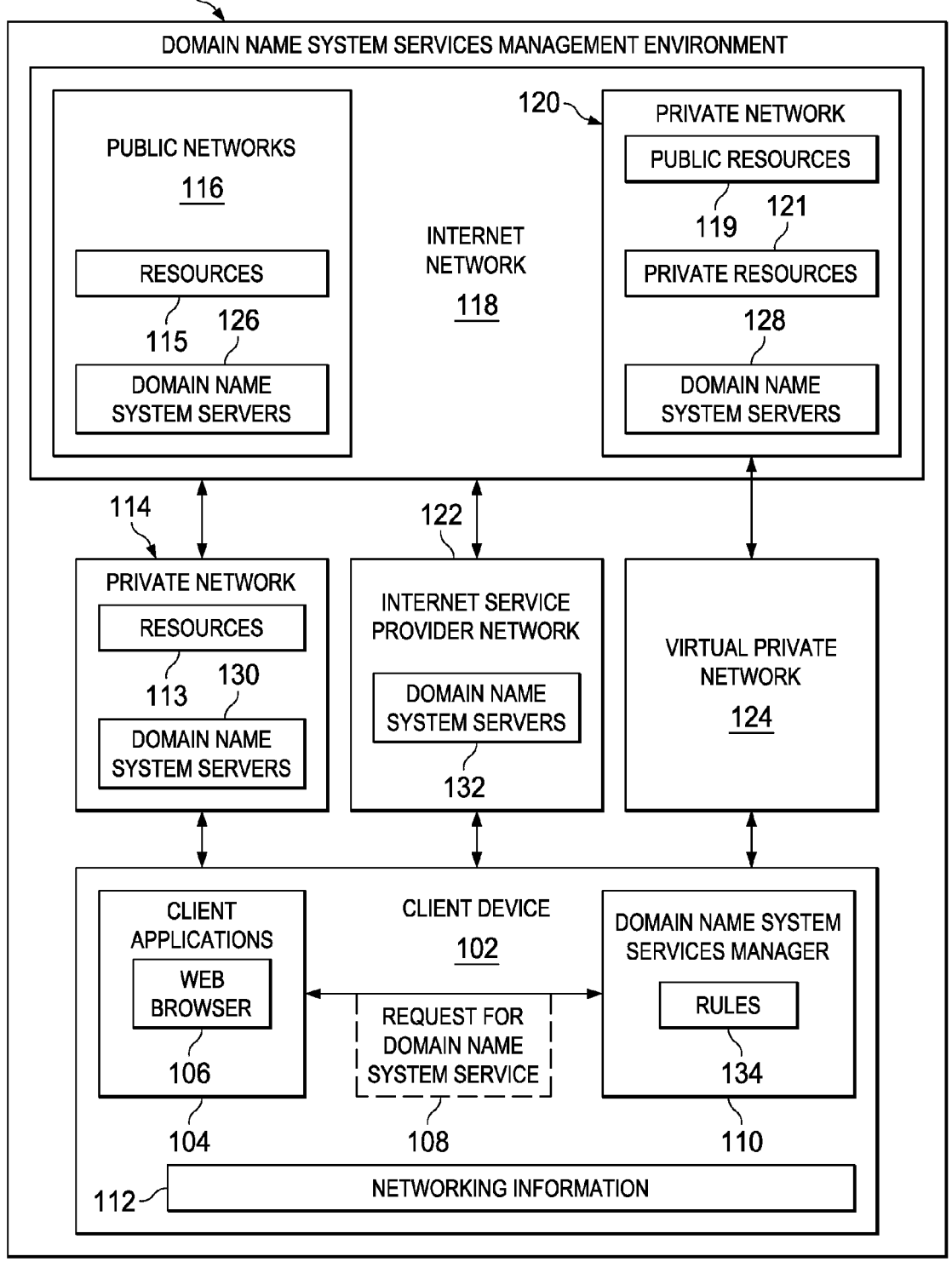
FIG. 1 is a block diagram of a domain name system services management environment for managing domain name system services for a plurality of networks in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer of the user, or entirely on the remote computer. In the latter scenario, the remote computer may be connected to the user's computer through any type of network, including a local area network (LAN) or a wide area network (WAN), or the connection may be made to an external computer (for example, through the Internet using an Internet Service Provider). In this latter scenario, the remote computer may also be connected to a number of other networks, each of the other networks comprising a number of private domains accessed by the remote computer. For example, the user may be an administrator of the remote computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments recognize and take into account that existing networks provide network information for use by network clients. The network information provided may include a list of private domains of the network, a set of domain name system servers of the network, and a set of routes. For example, this information may be determined from virtual private network (VPN) clients, from dynamic host configuration protocol (DHCP) clients, and from static internet protocol configurations.

The different illustrative embodiments provide a method, data processing system, and computer program product to manage domain name system services for a plurality of networks. For example, the different illustrative embodiments may use a process for managing domain name system services for a plurality of networks connected to client devices. For example, a domain name system services manager may identify information for the plurality of networks to which a client device is connected. The information for each network in the plurality of networks includes a set of private domains, a set of domain name system servers for use in searching for internet protocol addresses for domain names, and a set of routes. The domain name system services manager may receive a request to identify an internet protocol address for a domain name. In response to the request, the domain name system services manager may select a particular set of domain name system servers of a particular network in the plurality of networks based on the information for the plurality of networks and a set of rules for selecting the particular set of domain name system servers when identifying the internet protocol address for the domain name. Responsive to the selection, the domain name system services manager sends the request to identify the internet protocol address for the domain name to a domain name system server in the particular set of domain name system servers.

With reference now to the figures and, in particular, with reference to FIG. 1, a block diagram of a domain name system services management environment for managing domain name system services for a plurality of networks is depicted in accordance with an illustrative embodiment. In this illustrative example, domain name system services management environment 100 is depicted in block diagram form.

In these illustrative examples, client applications 104 run on computing devices such as client device 102 within domain name system services management environment 100.

Client applications 104 running on client device 102 may include at least one of web browser 106 and any other client application that uses domain name system services in domain name services management environment 100. In these illustrative examples, web browser 106 may receive user input for browsing web sites of private networks and public networks. Responsive to receiving user input for browsing domain names of web sites, web browser 106 generates requests to locate internet protocol addresses for the domain names of the web sites, such as request for domain name system service 108. As depicted, domain name system services manager 110 may receive or intercept request for domain name system service 108. In these illustrative examples, domain name system services manager 110 uses networking information 112 to identify which domain name system servers to use to service request for domain name system service 108.

As used herein, the phrase "at least one of," when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations. The item may be a particular object, thing, or a category. In other words, at least one of means any combination items and number of items may be used from the list but not all of the items in the list is required.

In this illustrative example, client device 102 and resources 113 are connected to private network 114; resources 115 are connected to public networks 116; public resources 119 and private resources 121 are connected to private network 120; and private network 114 is connected to internet network 118. As depicted, client device 102 communicates with resources 113 over private network 114. Client device 102 communicates with resources 115, public resources 119, and private resources 121 over any one of private network 114, internet service provider network 122, and virtual private network 124. In these illustrative examples, client device 102, resources 113, resources 115, public resources 119, private resources 121 use networking protocols to communicate with each other.

As used herein, a "resource" is one of a computing device, a service hosted by a computing device, and any other suitable type of resource in domain name system services management environment 100 that can be identified using an internet protocol (IP) address. As used herein, "connected to," when used with reference to items, means that the items are in communication with each other. These components may be in communication with each other through media selected from at least one of a wired communications link, an optical communications link, a wireless communications link, a shared memory, a network, a local area network, an intranet, and other suitable types of media that provide for communication between the items.

As depicted, resources 115 of public networks 116 and public resources 119 of private network 120 are resources that can be located in internet network 118 using set of domain name system servers 126. In these illustrative examples, private resources 121 of private network 120 are resources that can be located in private network 120 using set of domain name system servers 128. Private resources 121 of private network 120 are resources that cannot be located using set of domain name system servers 126 in these illustrative examples. Resources 113 of private network 114 are resources that can be located using domain name system servers 130. In this illustrative example, domain name system servers 132 is a subset of domain name system servers 126 for locating resources 115 and public resources 119 in internet network 118. As used herein, "a set of," when used with reference to items, means one or more items. As used herein, "a subset of," when used with reference to a set of items, means one or more items of the set of items.

In these illustrative examples, domain name system services manager 110 uses rules 134 to identify which domain name system servers to use for processing particular domain name system services requests. For example, responsive to receiving user input for browsing a particular domain name of a particular web site, web browser 106 may generate request for domain name system service 108 for locating an internet protocol address for the particular domain name of the particular web site. In this example, domain name system services manager 110 determines where to send request for domain name system service 108 based on networking information 112 and rules 134 for selecting domain name system servers to use for locating an internet protocol address for the particular domain name of the particular web site.

The illustration of domain name system services management environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, private networks, in addition to private network 120, may be present within domain name system services management environment 100. Also, although domain name system services manager 110 is shown as a block in client device 102, domain name system services manager 110 may be implemented in another computer system or device outside of client device 102. In other examples, domain name system services manager 110 may be implemented by any combination of hardware and software products, and may also be implemented in one or more computer systems of a cluster of computer systems. In still other examples, domain name system services manager 110 may be implemented in a client application, such as web browser 106.

Figure 2:
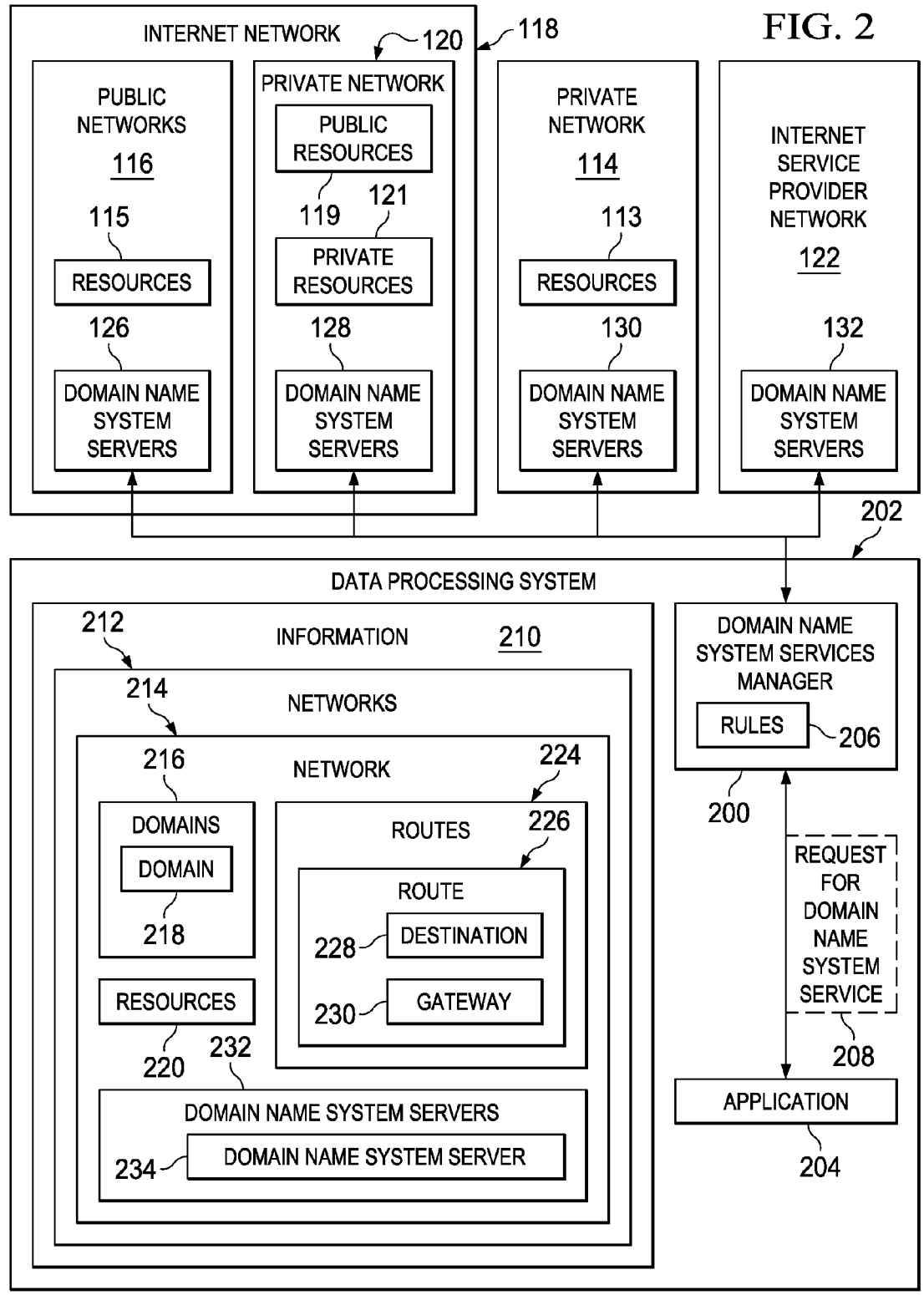
FIG. 2 is a block diagram of components involved in managing domain name system services for a plurality of networks in use by a data processing system in accordance with an illustrative embodiment.

Turning next to FIG. 2, a block diagram of components involved in managing domain name system services for a plurality of networks in use by a data processing system is depicted in accordance with an illustrative embodiment. Domain name system services manager 200 in data processing system 202 is an example of one implementation of domain name system services manager 110 in client device 102 in domain name system services management environment 100 in FIG. 1. In these illustrative examples, domain name system services manager 200 may be an example of a domain name system resolver or a domain name system stub resolver. Application 204 is an example of an application in client applications 104 in FIG. 1, such as web browser 106 in FIG. 1. Rules 206 is an example of rules 134 in FIG. 1. Request for domain name system service 208 is an example of request for domain name system service 108 in FIG. 1. Information 210 is an example of networking information 112 in FIG. 1.

As depicted, information 210 comprises information for each network in number of networks 212, such as network 214. Number of domains 216 in information 210 for network 214 is a number of domains for resources hosted within network 214. In these illustrative examples, each domain in domains 216 may be a private or public domain. For example, domain 218 in number of domains 216 may be a public or private domain in a hierarchy of public and private domains of resources 220 in network 214. In these illustrated examples, resources 220 is an example of resources 113, resources 115, public resources 119, and private resources 121. As depicted, information 210 for networks 212, such as network 214, also includes number of routes 224.

Data processing system 202 uses routing tables, such as number of routes 224 to locate a gateway where internet protocol packets are sent that are destined for resources 220. In these illustrative examples, number of routes 224 is a routing table comprising a number of routes, such as route 226. Each route in number of routes 224 comprises a destination, such as destination 228, and a gateway, such as gateway 230. As depicted, destination 228 in route 226 is a destination for a resource for which internet protocol packets are destined. As also depicted, gateway 230 is the location where packets destined for destination 228 are sent. As used herein, a "gateway," such as gateway 230, is a special type of resource that routes internet protocol packets destined for a resource in a network.

In these illustrative examples, information 210 in data processing system 202 for each network, such as network 214, includes number of domain name system servers 232, such as domain name system server 234. In the illustrative examples, domain name system services manager 200 may cache responses from domain name system servers, such as caching a number of domain names and a number of internet protocol addresses for each domain name in the number of domain names.

For example, data processing system 202 may be connected to private network 114 with domain "customer.com", also connected to private network 120 through a virtual private network (VPN), such as virtual private network 124 in FIG. 1. In this example, "website.com" may be a domain of private network 120 and application 204 may be attempting to access a resource on hostname "intranet.website.com" via request for domain name system service 208. In this example, request for domain name system service 208 is a request to identify an internet protocol address for "intranet.website.com." Responsive to not having a cached answer for request for domain name system service 208, domain name system services manager 200 processes information 210 using rules 206 to determine which domain name system servers of which network in networks 212 to send request for domain name system service 208 to. In this example, the hostname "intranet.website.com" has domain "website.com." Further in this example, a rule in rules 206 directs the request to domain name system servers 128 of private network 120 by selecting private network 120 in networks 212 because "website.com" is a domain served by private network 120. After domain name system services manager 200 selects private network 120, domain name system services manager 200 then retrieves domain name system servers 128 of private network 120 from domain name system servers 232 for private network 120 in information 210. Responsive to selecting and retrieving the domain name system servers to use, domain name system services manager 200 performs the function of a domain name system resolver, or uses a domain name system resolver in data processing system 202, to process request for domain name system service 208 by communicating electronically with domain name system servers 128.

In this illustrative example, responsive to identifying an internet protocol address for "intranet.website.com" the internet protocol address is sent to application 204 as a response to request for domain name system service 208.

The illustration of data processing system 202 in FIG. 2 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional domain name system services managers, in addition to domain name system services manager 200, may be present within data process system 202. For example, a number of domain name system services managers may be located in data processing system 202, such as one unique domain name system services manager for each application in data processing system 202 that uses networks connected to data processing system 202. As another example, rules 206 may be located in different locations, such as other portions of data process system 202 and in one or more resources located outside of data processing system 202.

Figure 3:
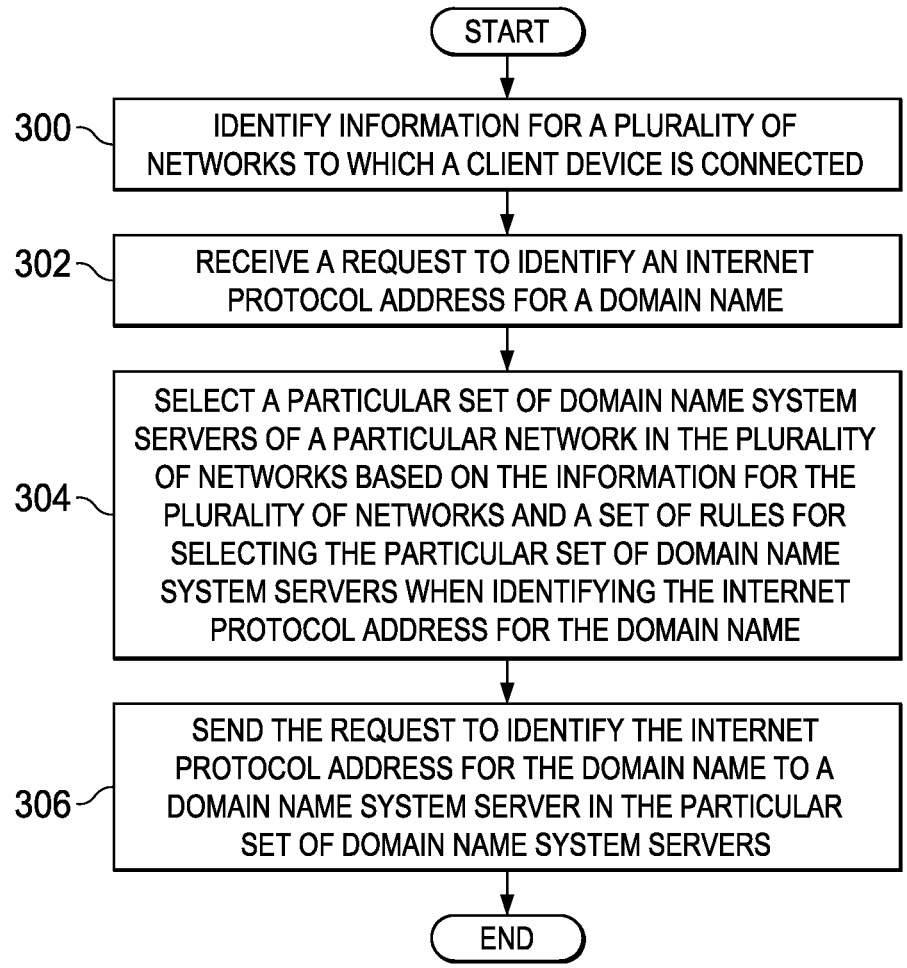
FIG. 3 is a flow chart of a process for managing domain name system services for a plurality of networks in accordance with an illustrative embodiment.

Turning now to FIG. 3, an illustrative example of a flowchart of a process for managing domain name system services for a plurality of networks is depicted in accordance with an illustrative embodiment. The steps in the process may be implemented in software, hardware, or a combination of the two by domain name system services manager 200 in data processing system 202 in FIG. 2.

The process begins by identifying information for a plurality of networks to which a client device is connected (step 300). In this illustrated process, the client device is an example of client device 102 in FIG. 1 and the plurality of networks is an example of public networks 116, private network 114, private network 120, internet service provider network 122, and virtual private network 124 in FIG. 1.

The process receives a request to identify an internet protocol address for a domain name (step 302). The request in this illustrated process is an example of request for domain name system service 208 in FIG. 2. Responsive to receiving the request, the process selects a particular set of domain name system servers of a particular network in the plurality of networks based on the information for the plurality of networks and a set of rules for selecting the particular set of domain name system servers when identifying the internet protocol address for the domain name (step 304). In this illustrated process, the information is an example of information 210 in FIG. 2 and the set of rules is an example of rules 206 in FIG. 2. The particular network is an example of network 214 in FIG. 2 and the set of domain name system servers is an example of domain name system servers 232 in FIG. 2.

Responsive to selecting the particular set of domain name system servers for the request, the process sends the request to identify the internet protocol address for the domain name to a domain name system server in the particular set of domain name system servers (step 306) with the process terminating thereafter. For example, the process may send the request to the first domain name system server in the particular set of domain name system servers. If the first domain name services server does not respond, the process may send the request to another domain name system server in the particular set of domain name system servers, with the process repeating until the internet protocol address is returned for the domain name. Additionally, the process may send the request in parallel to all of the domain name system servers in the particular set of domain name system servers. If the none of the domain name system servers in the particular set of domain name system servers returns the internet protocol address, the process goes back to step 304 to identify a different set of domain name system servers according to the rules and the additional information that the particular set of domain name system servers was not able to return the internet protocol address for the domain name.

Figure 4:
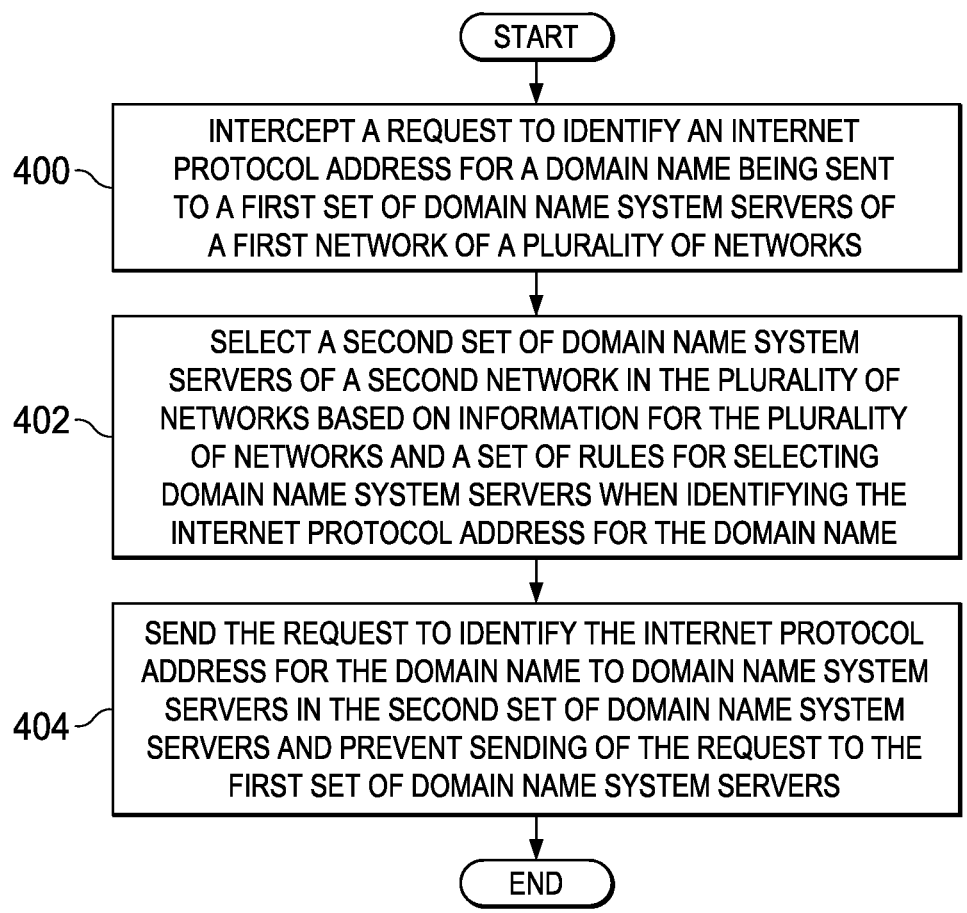
FIG. 4 is a flow chart of a process for managing intercepted requests for domain name system services for a plurality of networks in accordance with an illustrative embodiment.

Turning next to FIG. 4, an illustrative example of a flowchart of a process for managing intercepted requests for domain name system services for a plurality of networks is depicted in accordance with an illustrative embodiment. The steps in the process may be implemented in software, hardware, or a combination of the two by domain name system services manager 200 in data processing system 202 in FIG. 2.

The process begins by intercepting a request to identify an internet protocol address for a domain name being sent to a first set of domain name system servers of a first network of a plurality of networks (step 400). In this illustrated process, the plurality of networks is an example of public networks 116, private network 114, private network 120, internet service provider network 122, and virtual private network 124 in FIG. 1. The request in this illustrated process is an example of request for domain name system service 208 in FIG. 2.

Responsive to receiving the request, the process selects a second set of domain name system servers of a second network in the plurality of networks based on information for the plurality of networks and a set of rules for selecting domain name system servers when identifying the internet protocol address for the domain name (step 402). In this illustrated process, the information is an example of information 210 in FIG. 2 and the set of rules is an example of rules 206 in FIG. 2. The second network is an example of network 214 in FIG. 2 and the set of domain name servers is an example of domain name system servers 232 in FIG. 2. Responsive to selecting the particular set of domain name system servers for the request, the process sends the request to identify the internet protocol address for the domain name to domain name system servers in the second set of domain name system servers and prevents sending of the request to the first set of domain name system servers (step 404) with the process terminating thereafter.

Figure 5:
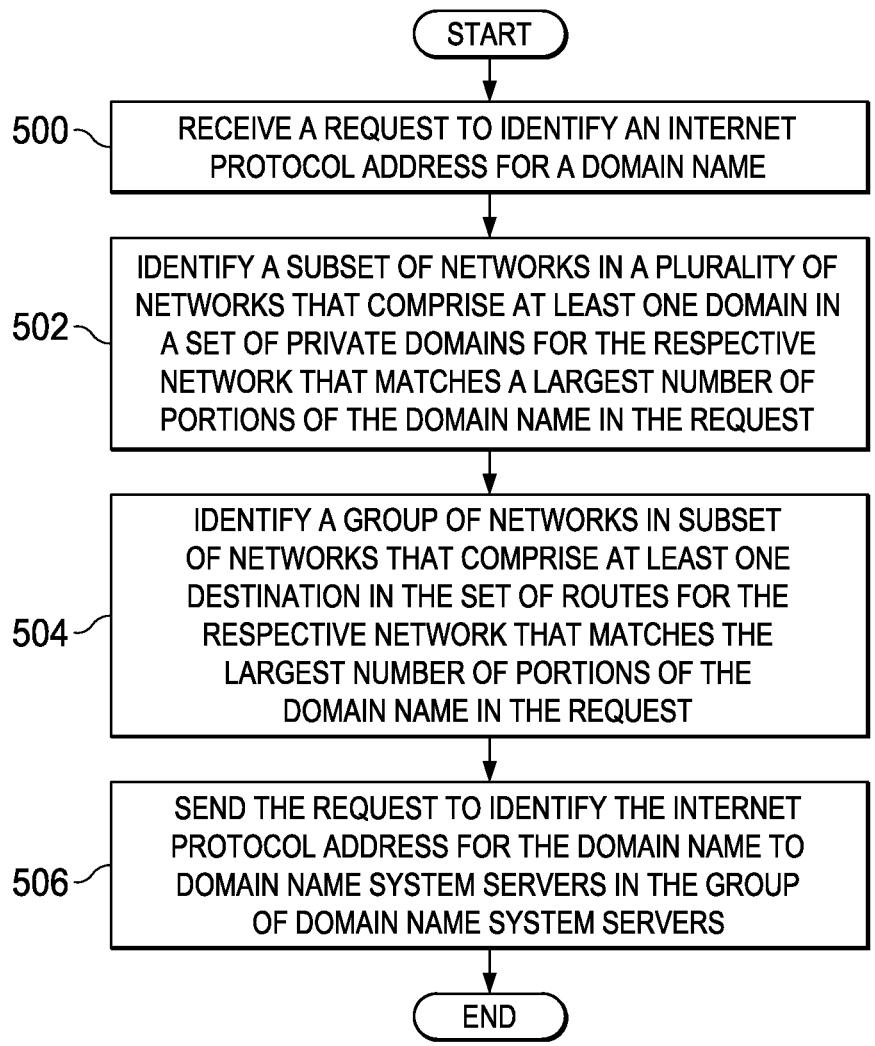
FIG. 5 is a flow chart of a process for managing domain name system services for a plurality of networks based on identified matching information in accordance with an illustrative embodiment.

Turning next to FIG. 5, an illustrative example of a flowchart of a process for managing domain name system services for a plurality of networks based on identified matching information is depicted in accordance with an illustrative embodiment. The steps in the process may be implemented in software, hardware, or a combination of the two by domain name system services manager 200 in data processing system 202 in FIG. 2.

The process begins by receiving a request to identify an internet protocol address for a domain name (step 500). The process identifies a subset of networks in a plurality of networks that comprise at least one domain in a set of private domains for the respective network that matches a largest number of portions of the domain name in the request (step 502). The process next identifies a group of networks in subset of networks that comprise at least one destination in the set of routes for the respective network that matches the largest number of portions of the domain name in the request (step 504). Responsive to identifying the group of networks, the process sends the request to identify the internet protocol address for the domain name to domain name system servers in the group of domain name system servers (step 506) with the process terminating thereafter. As used herein, "a group of," when used with reference to items, means a number of items.

Figure 6:
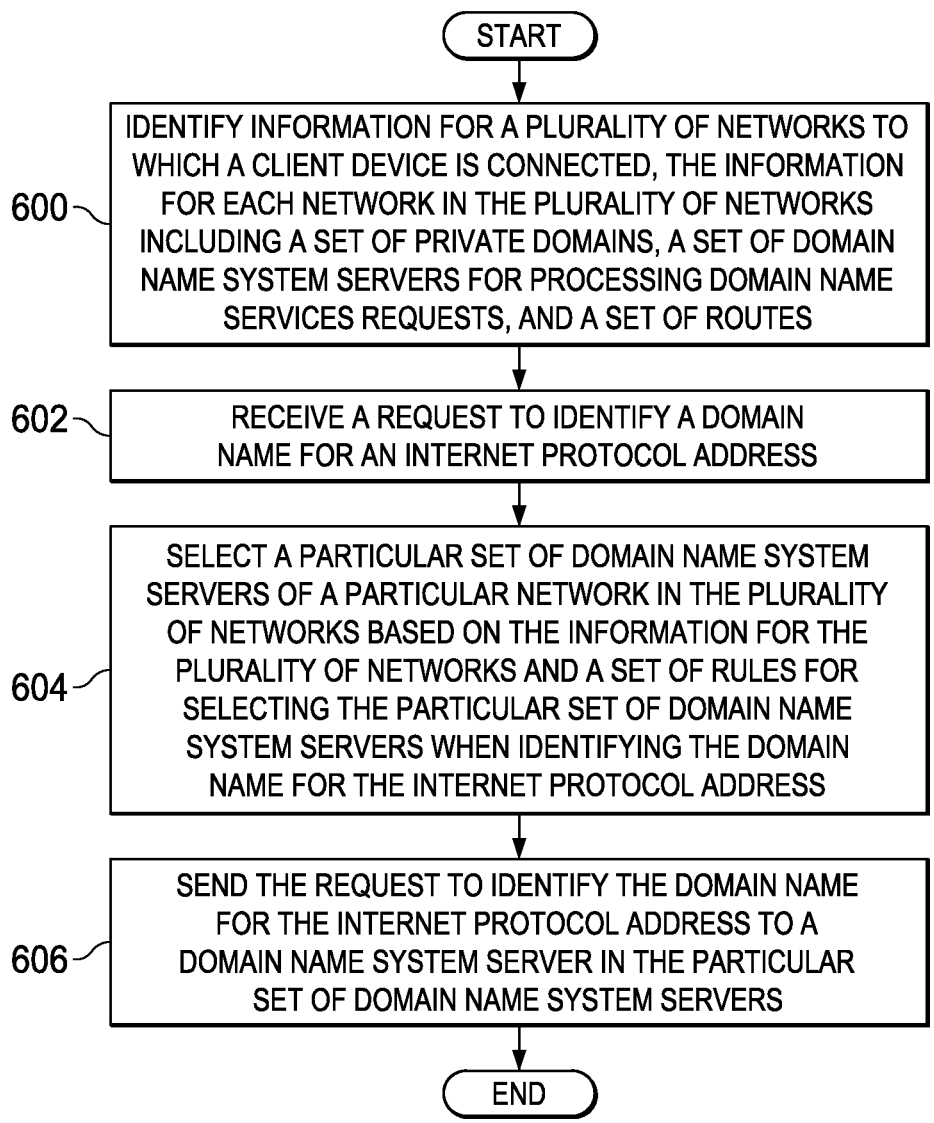
FIG. 6 is a flow chart of a process for managing domain name system services for a plurality of networks in accordance with an illustrative embodiment.

Turning next to FIG. 6, an illustrative example of a flowchart of a process for managing domain name system services for a plurality of networks is depicted in accordance with an illustrative embodiment. The steps in the process may be implemented in software, hardware, or a combination of the two by domain name system services manager 200 in data processing system 202 in FIG. 2.

The process begins by identifying information for a plurality of networks to which a client device is connected, wherein the information for each network in the plurality of networks includes a set of private domains, a set of domain name system servers for processing domain name system services requests, and a set of routes (step 600). In this illustrated process, the client device is an example of client device 102 in FIG. 1 and the plurality of networks is an example of public networks 116, private network 114, private network 120, internet service provider network 122, and virtual private network 124 in FIG. 1. The information in this illustrated process is an example of information 210 in FIG. 2.

The process receives a request to identify a domain name for an internet protocol address (step 602). The request in this illustrated process is an example of request for domain name system service 208 in FIG. 2. Responsive to receiving the request, the process selects a particular set of domain name system servers of a particular network in the plurality of networks based on the information for the plurality of networks and a set of rules for selecting the particular set of domain name system servers when identifying the domain name for the internet protocol address (step 604). The particular network in this illustrated process is an example of network 214 in FIG. 2 and the set of domain name system servers is an example of domain name system servers 232 in FIG. 2. The set of rules is an example of rules 206 in FIG. 2.

Responsive to selecting the particular set of domain name system servers for the request, the process sends the request to identify the domain name for the internet protocol address to a domain name system server in the particular set of domain name system servers (step 606) with the process terminating thereafter.

Turning now to FIG. 7, an illustration of a data processing system is depicted in accordance with an illustrative embodiment. Data processing system 700 is an example of a data processing system that may be used to implement managing resources of clusters in a cluster resource management system. Data processing system 700 is also an example of a data processing system that may be used to implement client device 102 in FIG. 1. More particularly, data processing system 700 may be used to implement data processing system 202 in FIG. 2. In this illustrative example, data processing system 700 includes communications framework 702, which provides communications between processor unit 704, memory 706, persistent storage 708, communications unit 710, input/output (I/O) unit 712, and display 714. In these examples, communications frame work 702 may be a bus system.

Processor unit 704 serves to execute instructions for software that may be loaded into memory 706. Processor unit 704 may be a number of processors, a multi-processor core, or some other type of processor, depending on the particular implementation. "A number," as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications framework 702 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 706, or a cache, such as found in an interface and memory controller hub that may be present in communications framework 702.

Thus, the illustrative embodiments provide a method, data processing system, and computer program product for managing domain name system services for a plurality of networks. In one example, a program runs in a computer system and identifies information for the plurality of networks to which the computer system is connected. The information for each network in the plurality of networks includes a set of private domains, a set of domain name system servers for use in searching for internet protocol addresses for domain names, and a set of routes. In this example, the program receives a request to identify an internet protocol address for a domain name. In response to the request, the program selects a particular set of domain name system servers of a particular network in the plurality of networks based on the information for the plurality of networks and a set of rules for selecting the particular set of domain name system servers when identifying the internet protocol address for the domain name. The program then sends the request to identify the internet protocol address for the domain name to a domain name system server in the particular set of domain name system servers.

In another example, the receiving step comprises intercepting the request on the computer system before the request has been sent to any domain name system servers. In this example, the intercepting step prevents the client device from sending the request to any domain name system servers that are not in the particular set of domain name system servers of the particular network.

In still another example, the program receives a request to identify an internet protocol address for a domain name. In this example, the program selects a particular set of domain name system servers of a particular network in the plurality of networks based on the information for the plurality of networks and a set of rules for selecting the particular set of domain name system servers when identifying the domain name for the internet protocol address.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing domain name system services for a plurality of networks, the method comprising:

identifying, by one or more processor units, information for the plurality of networks to which a client device is connected, the information for each network in the plurality of networks including a set of private domains, a set of domain name system servers for use in searching for internet protocol addresses for domain names, and a set of routes;

receiving, by the one or more processor units, a request to identify an Internet protocol address for a domain name;

responsive to not having a cached answer for the request to identify the internet protocol address for the domain name, determining, by the one or more processor units, to which domain name system servers of which network in the plurality of networks to send the request to identify the Internet protocol address for the domain name using the information for the plurality of networks and a set of rules, wherein the set of rules for selecting the particular set of domain name system servers when identifying the Internet protocol address for the domain name includes a rule for selecting the particular set of domain name system servers for the particular network using matches between portions of the domain name in the request and portions of domains in the set of private domains for each network in the plurality of networks;

selecting, by the one or more processor units, a particular network as a subset of the plurality of networks and a particular set of domain name system servers of the particular network using the information for the plurality of networks and the set of rules for selecting the particular set of domain name system servers when identifying the Internet protocol address for the domain name, wherein the selecting, by the one or more processor units, the particular set of domain name system servers of the particular network in the plurality of networks further comprises:

identifying a subset of networks in the plurality of networks that comprise at least one domain in the set of private domains for a respective network that matches a largest number of portions of the domain name in the request; and responsive to the subset of networks comprising only one network, selecting a respective set of domain name system servers of the one network in the subset of networks as the particular set of domain name system servers of the particular network; and sending the request to identify the Internet protocol address for the domain name, by the one or more processor units, to a domain name system server in the particular set of domain name system servers.

2. The method of claim 1, wherein the set of rules for selecting the particular set of domain name system servers includes a rule for selecting a default set of domain name system servers of a default network in the plurality of networks when no other rules in the set of rules identifies the particular set of domain name system servers of the particular network in the plurality of networks, and wherein selecting, by the one or more processor units, the particular set of domain name system servers of the particular network in the plurality of networks further comprises:

selecting the default set of domain name system servers of the default network as the particular set of domain name system servers of the particular network based on the rule for selecting the default set of domain name system servers of the default network.

3. The method of claim 1, wherein the set of routes is a routing table, and wherein each route in the set of routes comprises a destination and a gateway, and electronic communications to the destination occur through the gateway, and wherein the set of rules for selecting the particular set of domain name system servers when identifying the Internet protocol address for the domain name includes another rule for selecting the particular set of domain name system servers for the particular network based on matches between portions of the domain name in the request and portions of destinations in the set of routes for each network in the plurality of networks, and wherein responsive to the subset of networks comprising two or more networks, the selecting, by the one or more processor units, of the particular set of domain name system servers of the particular network in the plurality of networks further comprises:

identifying a group of networks in the subset of networks that comprise at least one destination in the set of routes for the respective network that matches the largest number of portions of the domain name in the request; and responsive to the group of networks comprising only one network, selecting the respective set of domain name system servers of the one network in the group of networks as the particular set of domain name system servers of the particular network.

4. The method of claim 1, wherein the plurality of networks is a number of logical networks comprising a number of virtual private networks and number of public networks.

5. The method of claim 1, wherein the domain name is a fully qualified domain name.

6. The method of claim 1, wherein receiving the request, by the one or more processor units, to identify the Internet protocol address for the domain name comprises intercepting the request on the client device before the request has been sent to any domain name system servers.

7. The method of claim 6, wherein an interception of the request prevents the client device from sending the request to any domain name system servers that are not in the particular set of domain name system servers of the particular network.

8. A computer program product for managing domain name system services for a plurality of networks, the computer program product comprising program instructions stored on a computer readable storage device, for execution by one or more processors of a data processing system, the program instructions further comprising:

program instructions for identifying information for the plurality of networks to which a client device is connected, the information for each network in the plurality of networks including a set of private domains, a set of domain name system servers for use in searching for internet protocol addresses for domain names, and a set of routes;

program instructions for receiving a request to identify an Internet protocol address for a domain name;

program instructions responsive to not having a cached answer for the request to identify the Internet protocol address for the domain name, for determining to which domain name system servers of which network in the plurality of networks to send the request to identify the Internet protocol address for the domain name using the information for the plurality of networks and a set of rules, wherein the set of rules for selecting the particular set of domain name system servers when identifying the Internet protocol address for the domain name includes a rule for selecting the particular set of domain name system servers for the particular network using matches between portions of the domain name in the request and portions of domains in the set of private domains for each network in the plurality of networks;

program instructions for selecting, a particular network as a subset of the plurality of networks and a particular set of domain name system servers of the particular network using the information for the plurality of networks and the set of rules for selecting the particular set of domain name system servers when identifying the Internet protocol address for the domain name, wherein the program instructions for selecting the particular set of domain name system servers of the particular network in the plurality of networks further comprise:

program instructions for identifying a subset of networks in the plurality of networks that comprise at least one domain in the set of private domains for a respective network that matches a largest number of portions of the domain name in the request; and program instructions responsive to the subset of networks comprising only one network, for selecting a respective set of domain name system servers of the one network in the subset of networks as the particular set of domain name system servers of the particular network; and program instructions for sending the request to identify the Internet protocol address for the domain name to a domain name system server in the particular set of domain name system servers.

9. The computer program product of claim 8, wherein the set of rules for selecting the particular set of domain name system servers includes a rule for selecting a default set of domain name system servers of a default network in the plurality of networks when no other rules in the set of rules identifies the particular set of domain name system servers of the particular network in the plurality of networks, and wherein the program instructions for selecting the particular set of domain name system servers of the particular network in the plurality of networks further comprise:
  program instructions for selecting the default set of domain name system servers of the default network as the particular set of domain name system servers of the particular network based on the rule for selecting the default set of domain name system servers of the default network.

10. The computer program product of claim 8, wherein the set of routes is a routing table, and wherein each route in the set of routes comprises a destination and a gateway, and electronic communications to the destination occur through the gateway, and wherein the set of rules for selecting the particular set of domain name system servers when identifying the Internet protocol address for the domain name includes another rule for selecting the particular set of domain name system servers for the particular network based on matches between portions of the domain name in the request and portions of destinations in the set of routes for each network in the plurality of networks, and wherein responsive to the subset of networks comprising two or more networks, the program instructions for selecting the particular set of domain name system servers of the particular network in the plurality of networks further comprise:
  program instructions for identifying a group of networks in the subset of networks that comprise at least one destination in the set of routes for the respective network that matches the largest number of portions of the domain name in the request; and
  program instructions responsive to the group of networks comprising only one network, for selecting the respective set of domain name system servers of the one network in the group of networks as the particular set of domain name system servers of the particular network.

11. The computer program product of claim 8, wherein the plurality of networks is a number of logical networks comprising a number of virtual private networks and number of public networks.

12. The computer program product of claim 8, wherein the domain name is a fully qualified domain name.

13. The computer program product of claim 8, wherein the program instructions for receiving the request to identify the Internet protocol address for the domain name comprises program instructions for intercepting the request on the client device before the request has been sent to any domain name system servers.

14. The computer program product of claim 13, wherein the program instructions for intercepting the request prevents the client device from sending the request to any domain name system servers that are not in the particular set of domain name system servers of the particular network.

15. A data processing system for managing domain name system services for a plurality of networks, the system comprising:
  a bus;
  a memory connected to the bus, having program instructions stored therein;
  one or more processor units connected to the bus, wherein the one or more processor units execute the program instructions to direct the data processing system to:
  identify, by the one or more processor units, information for the plurality of networks to which a client device is connected, the information for each network in the plurality of networks including a set of private domains, a set of domain name system servers for use in searching for Internet protocol addresses for domain names, and a set of routes;
  receive, by the one or more processor units, a request to identify an Internet protocol address for a domain name;
  responsive to not having a cached answer for the request to identify the Internet protocol address for the domain name, determine, by the one or more processor units, to which domain name system servers of which network in the plurality of networks to send the request to identify the Internet protocol address for the domain name using the information for the plurality of networks and a set of rules, wherein the set of rules for selecting the particular set of domain name system servers when identifying the internet protocol address for the domain name includes a rule for selecting the particular set of domain name system servers for the particular network using matches between portions of the domain name in the request and portions of domains in the set of private domains for each network in the plurality of networks;
  select, by the one or more processor units, a particular network as a subset of the plurality of networks and a particular set of domain name system servers of the particular network using the information for the plurality of networks and the set of rules for selecting the particular set of domain name system servers when identifying the Internet protocol address for the domain name, wherein selecting the particular set of domain name system servers of the particular network in the plurality of networks further comprises:
    identify, by the one or more processor units, a subset of networks in the plurality of networks that comprise at least one domain in the set of private domains for a respective network that matches a largest number of portions of the domain name in the request; and
    responsive to the subset of networks comprising only one network, select, by the one or more processor units, a respective set of domain name system servers of the one network in the subset of networks as the particular set of domain name system servers of the particular network; and
  send, by the one or more processor units, the request to identify the Internet protocol address for the domain name to a domain name system server in the particular set of domain name system servers.

* * * * *